United States Patent [19]

Bieringer et al.

[11] Patent Number: 4,588,791

[45] Date of Patent: May 13, 1986

[54] PROCESS FOR THE PRODUCTION OF SUSPENSION POLYVINYL CHLORIDE SUITABLE FOR PROCESSING BY INJECTION MOLDING

[75] Inventors: Heimo Bieringer, Raesfeld-Erle; Martin Engler; Wolfgang Holtrup, both of Marl, all of Fed. Rep. of Germany

[73] Assignee: Huels Aktiengesellschaft, Marl, Fed. Rep. of Germany

[21] Appl. No.: 648,221

[22] Filed: Sep. 7, 1984

[30] Foreign Application Priority Data

Sep. 8, 1983 [DE] Fed. Rep. of Germany ....... 3332376

[51] Int. Cl.$^4$ ................................................. C08F 2/28
[52] U.S. Cl. ...................................... 526/78; 526/206
[58] Field of Search ........................................... 526/78

[56] References Cited

U.S. PATENT DOCUMENTS

| | | | |
|---|---|---|---|
| 3,956,251 | 5/1976 | Feiler et al. | 526/82 X |
| 3,956,985 | 5/1976 | Ishii | 101/142 |
| 4,072,806 | 2/1978 | Ravey | 526/89 |

Primary Examiner—Paul R. Michl
Attorney, Agent, or Firm—Millen & White

[57] ABSTRACT

A suspension polyvinyl chloride is produced which is especially suited for processing by injection molding because it exhibits a greatly improved flowability. Polymerization takes place with an ascending temperature control at at least two different temperatures, a regulator being added to the polymerization mixture by a one-time addition at a conversion of $\geq 20\%$ by weight and $\leq 70\%$ by weight.

13 Claims, No Drawings

PROCESS FOR THE PRODUCTION OF SUSPENSION POLYVINYL CHLORIDE SUITABLE FOR PROCESSING BY INJECTION MOLDING

BACKGROUND OF THE INVENTION

The invention relates to a process for the production of polyvinyl chloride having improved processability, especially in injection molding.

The past is replete with efforts to improve the processability of vinyl chloride polymers, i.e., to lower the viscosity of the polymer melt which, at a given temperature and shear rate, is dependent on the average molecular weight and the molecular weight distribution of the polyvinyl chloride. Thus, by using polyvinyl chloride of a low average molecular weight with a narrow molecular weight distribution, readily flowing polymer melts can be obtained but, as is known, these exhibit poor mechanical properties as finished components [Pol. Eng. Sci 17: 194 et seq. (1977)]. Processes have also become known for broadening the molecular weight distribution of polyvinyl chloride. Thus, according to DOS No. 2,651,532, a mechanical mixture of polyvinyl chloride powders with differing average molecular weights is prepared. This process, however, is expensive when conducted on an industrial basis. Furthermore, it yields powders which can be processed by injection-molding machines into smooth finished-part surfaces only if the average molecular weights of the mixed ingredients are not too different. The attainable reduction in melt viscosity is, however, small.

In contrast thereto, by mixing two powders having greatly differing average molecular weights, polyvinyl chloride finished parts are obtained with rough surfaces and flow lines. The cause is the heterogeneity of the powder. The very low molecular weight polyvinyl chloride grains melt more rapidly in the plasticizing zone of the injection-molding machine than the high-molecular weight polyvinyl chloride grains. This reduces the melt viscosity and similarly to the results of an excessive addition of a mold release agent, thereby impairs the plasticizing process for the high-molecular weight polyvinyl chloride grains, leading to the flaws in the finished part.

The disadvantage of using powder heterogeneity to affect molecular weight is avoided in the process of U.S. Pat. No. 4,072,806. This method varies molecular weight in vinyl chloride suspension polymerization by the simultaneous presence of regulating materials (lowering molecular weight) and branching agents (increasing the molecular weight). The thus-attainable reduction in polyvinyl chloride melt viscosity is linked to the amounts of regulating and branching components used as starting materials. The higher the quantities, the lower the melt viscosity. However, as has been borne out by experiments, using powdered material having reduced melt viscosity in accordance with this process, it is impossible to produce by the injection molding technique molded polyvinyl chloride articles having a flawlessly smooth surface characteristic. The cause of this resides in the nature of the branching component. The latter also leads to crosslinking of the macromolecules during the vinyl chloride polymerization when used in the high quantitites necessary for reducing melt viscosity. This can be readily investigated by preparing a solution of such a polyvinyl chloride powder in, for example, cyclohexanone because the crosslinked macromolecules are left therein as insoluble gel particles. Such crosslinked proportions in the powder prevent the production of the desired, smooth, flow-line-free finished surface during injection molding.

This drawback has been avoided in the process according to U.S. Pat. No. 3,956,985 which refrains from using branching components. A broadening of the molecular weight distribution is obtained therein by polymerization at at least two different temperatures, optionally in the presence of a compound having a regulating effect on the molecular weight. These regulators are added at the beginning of polymerization in this process.

The thus-attained reduction in melt viscosity for products having the same average molecular weight, is however, merely about 10%. Additional improvement is needed.

SUMMARY OF THE INVENTION

Accordingly, it is an object of this invention to provide such an improved process and product.

Upon further study of the specification and appended claims, further objects and advantages of this invention will become apparent to those skilled in the art.

These objects have been attained based on the discovery that polyvinyl chloride products can be produced which exhibit a substantially more greatly reduced melt viscosity than polyvinyl chloride homopolymers with the same average molecular weight and which can be injection molded into finished parts having smooth surfaces, without any loss in physical properties, by preparing a suspension polyvinyl chloride by polymerization at two or more temperatures in the presence of oil-soluble catalysts, suspension stabilizers, and regulators, the regulator being added as a one-time addition to the polymerization mixture at a vinyl chloride conversion of $\geq 20\%$ by weight and $\leq 70\%$ by weight, wherein the temperature rises after termination of the first polymerization stage.

DETAILED DISCUSSION

The polymerization can be performed, as customary, up to a final pressure of about 12–5 bar and/or up to a conversion of about 80–95%.

Addition of the regulator takes place suitably by way of a metering valve into the polymerization reactor by the application of a slight excess pressure. If metering pumps are provided, these can be used as well. The total time period of adding the regulator is not critical but usually should not exceed about 15 minutes.

All of the conventional compounds having a regulatory effect on the radical vinyl chloride polymerization can be utilized in the process of this invention, for example unsubstituted or substituted aliphatic aldehydes, saturated or unsaturated chlorinated hydrocarbons, and others. Sulfur-containing regulators preferably should not be utilized since these lead to difficulties during the fabrication of the polyvinyl chloride insofar as they show little compatibility with the frequently used Pb stabilizers. Especially suitable have proved to be saturated and unsaturated chlorinated hydrocarbons, e.g., trichloroethylene, dichloroethylene, 1-chloro-2-methylprop-1-ene, 3-chloro-2-methylprop-1-ene, because, on account of their high volatility, they can be readily removed from the polyvinyl chloride and from the suspension water discharged into the environment, and because they can be inexpensively removed from the residual vinyl chloride obtained during polyvinyl chloride degasification. Mixtures of several regulators can likewise be employed The amount of regulator added depends on its effectiveness in molecular weight reduction. A quantitative yardstick for this is the chain transfer constant which is tabulated for the system of vinyl chloride/regulator, for example, in "Encyclop. of Pol. Sci. Tech." 14: 332. The amount added should generally range from 0.1 to 10% by weight, preferably 1–6% by weight, especially 3–5% by weight. With a high chain transfer constant, the amount of regulator required will be considerably reduced. Optimized amounts can be routinely determined by conventional preliminary testing.

The timing of the addition of the regulator, affecting the average molecular weight of the polyvinyl chloride and also the extent of reduction in melt viscosity, is to be chosen so that the vinyl chloride conversion at that time is $\geq 20$ and $\leq 70\%$ by weight, preferably $\geq 25$ and $\leq 50\%$ by weight. Another influential variable for the point of adding the regulator is the temperature control during polymerization. This control is to be executed so that the polymerization is effected at two or more temperatures; the temperature, in this connection, is to rise in going from one stage to the next or continuously. In a preferred embodiment, only two temperature stages are selected. These are preferably far apart, e.g., about 25° to 54° C. (first stage) and about 55° to 80° C. (second stage). The regulator can be added shortly before termination of the first polymerization stage or temperature stage in this system. In general, a time period of 5–15 minutes between the end of regulator addition and the beginning of the next polymerization stage or the temperature increase is adequate for a uniform distribution of the regulator in the polymer suspension prior to the beginning of the next polymerization stage or temperature increase. If the regulator were to be added after the end of the temperature increase at a higher polymerization temperature, this would lead to difficulties in heat removal from the reactor because without the presence of the regulator, the polymerization velocity of the vinyl chloride rises greatly at high temperatures due to the more rapid disintegration of the initiators; this can result in runaway of the reactor especially in the case of large-size reactors.

As explained, in a two temperature stage polymerization, the regulator is added before the end of the first stage. In systems with more than two stages or with continuous temperature increase, this is not necessarily the case. In such systems, the entire regulator amount is to be added not only within the stated conversion range but also before reaction temperature reaches about 75° C., preferably before it reaches about 70° C. As explained above, the regulator should be added 5–15 minutes before this temperature is reached.

The average molecular weight of the polyvinyl chloride is reciprocal to the polymerization temperature. The larger the temperature difference of the polymerization stages, the broader will be the molecular weight distribution of the polyvinyl chloride. On the other hand, the disintegration velocity of the radical initiators is, according to Arrhenius' law, dependent exponentially on the reciprocal temperature. In the interest of economical space-time yields, the initial polymerization temperature is thus selected to be suitably between 25° and 54° C., preferably 35° and 50° C., and then the temperature is increased either stepwise or continuosuly ($\geq 0.01°$ C./min and $\leq 5°$ C./min) to 55°–80° C., preferably to 65°–75° C.

All of the oil-soluble radical initiators known for vinyl chloride polymerization can be utilized, for example, acetylcyclohexylsulfonyl peroxide, alkyl perneodecanoate, dialkyl peroxodicarbonate, dilauryl peroxide, azobisisobutyronitrile, alkyl perpivalate and the like.

The initiator should be used in concentrations of 0.01 to 1, preferably 0.05 to 0.5% by weight of the vinyl chloride. However, it is recommended to use combinations of at least two initiators, the half-life periods of which are adapted to the selected polymerization temperature stages in such a way that these range between 1 and 10 hours. Thereby a uniform vinyl chloride conversion per unit time is attained without having to add still more initiator during the polymerization. Examples of especially suitable initiators are combinations of dialkyl peroxodicarbonates or acetylcyclohexylsulfonyl peroxide or alkyl perneodecanoate with dilauryl peroxide or azobisisobutyronitrile.

Suitable suspension stabilizers include all types of compounds known and customarily employed for vinyl chloride polymerization, as disclosed, for example, in the Kainer monograph, "Polyvinylchlorid and Vinylchlorid-Mischpolymerisate" [Polyvinyl Chloride and Vinyl Chloride Copolymers], Springer Publishers, Berlin/Heidelberg/New York (1965), pp. 16 et seq. Further auxiliary agents to be used are optional pH buffers, such as ammonium salts, alkali carbonates, aids against wall deposits, antioxidants, etc.

In general, all conditions and details of the process of this invention except as indicated otherwise herein, are as known, e.g., as described in U.S. Pat. No. 3,956,985, which disclosure is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A 40-liter polymerization reactor of stainless steel, equipped with impeller agitator and Pfaudler baffle, was charged with the following ingredients: 20,000 parts of water containing dissolved therein 15 parts of a partially saponified polyvinyl acetate (72 mol-% hydrolysis degree, viscosity 5 mPa s, measured as a 4% by weight aqueous solution at 20° C. with Höppler falling-ball viscometer) and wherein there are dispersed: 10 parts of dilauryl peroxide and 15 parts of dicetylperoxodicarbonate. The reactor was sealed, purged with nitrogen, evacuated, the agitator was adjusted to a speed of 280 rpm, and the reactor then charged with 10,000 parts of vinyl chloride. The reactor was heated to 43° C. at a rate of 0.8° C./min whereupon polymerization commenced. After 5.5 hours, a vinyl chloride conversion of 38% by weight was attained, and 300 parts of methallyl chloride was added by way of a pressure charging valve. Fifteen minutes after the regulator addition, the content was heated to 74° C. at a rate of 0.8° C./min and polymerization was carried out at this temperature to a final pressure of 10 bar. The product, after degasification, was separated from the major portion of the water and dried at 50° C. in a fluidized-bed dryer, thus obtaining a suspension polyvinyl chloride with a K value of 58.5. As can be seen from Table 1, the product exhibits during injection molding a substantially higher fluidity as compared with a suspension polyvinyl chloride having a K value of 58, and can be processed into transparent molded articles with a smooth surface.

EXAMPLE 2

The procedure of Example 1 was repeated, but using as the initiator only 15 parts of dicetylperoxodicarbonate. With a vinyl chloride conversion of 34% by weight, 400 parts of trichloroethylene was added and the reactor then heated to 74° C. With polymerization to a final pressure of 7 bar, a product is obtained having a K value of 55.5 and a high flowability, as can be seen from Table 1.

EXAMPLE 3

The process of Example 1 was repeated, but using as the initiators 13 parts of dilauryl peroxide and 11 parts of dicetylperoxodicarbonate, and the reactor was heated to 54° C. With a vinyl chloride conversion of 60% by weight, 400 parts of methallyl chloride was added and the reactor then heated to 74° C., thus obtaining a product having a K value of 57.5 and a high flowability, as can be seen from Table 1.

COMPARATIVE EXAMPLE A

The process of Example 1 was repeated, but after a vinyl chloride conversion of 11% by weight, the reactor was heated from 43° C. to 74° C. without adding a regulator. By polymerizing to a final pressure of 7 bar, a product is obtained having a K value of 57, but a low fluidity, as can be seen from Table 1.

COMPARATIVE EXAMPLE B

The process of Example 3 was repeated, but at a vinyl chloride conversion of 59% by weight, 300 parts of methallyl chloride was added and the polymerization was continued at 54° C. to a final pressure of 7 bar. As can be derived from Table 1, the product with a K value of 58.5 shows only slightly improved flowability as compared with the suspension polyvinyl chloride having a K value of 58.

EXAMPLE 4

A 40-liter polymerization reactor of stainless steel, equipped with impeller agitator and Pfaudler baffle, was charged with the following components: 20,000 parts of water containing dissolved therein 13 parts of a partially saponified polyvinyl acetate (72 mol-% hydrolysis degree, viscosity 5 mPa s, measured as a 4% by weight aqueous solution at 20° C. with Höppler falling-ball viscometer) and wherein there were dispersed 10 parts of dilauryl peroxide and 5 parts of cumyl perneodecanoate. The reactor was sealed, purged with nitrogen, evacuated, the agitator adjusted to a speed of 280 rpm, and the reactor then charged with 10,000 parts of vinyl chloride. The reactor was heated at a rate of 0.8° C./min to 35° C. and immediately thereafter at a rate of 0.0833° C./min, corresponding to a period of 8 hours, to 75° C. With a vinyl chloride conversion of 30% by weight, at a termperature of 42° C., 300 parts of trichloroethylene was added by way of a pressure charging valve; immediately thereafter, the reactor was further heated continuously and polymerization was performed at 75° C. up to a final pressure of 7 bar. The product, after degasification, was separated from the major portion of the water and dried at 50° C. in a fluidized-bed dryer. The K value of the product is 55. As can be seen from Table 2, the product shows a higher flowability during injection molding as compared with the suspension polyvinyl chloride having a K value of 58, and can be processed into transparent molded articles having a smooth surface.

EXAMPLE 5

The process of Example 4 was repeated, but with a vinyl chloride conversion of 41% by weight, 400 parts of methallyl chloride was added. Polymerization was carried out to a final pressure of 12 bar, thus obtaining a product having a K value of 57.5 and a high flowability, as can be seen from Table 2.

COMPARATIVE EXAMPLE C (According to DOS No. 1,943,638)

A 40-liter polymerization reactor of stainless steel, equipped with impeller agitator and Pfaudler baffle, was charged with the following ingredients: 20,000 parts of water containing dissolved therein 15 parts of a partially saponified polyvinyl acetate according to Example 1 and wherein there are dispersed 10 parts of dilauryl peroxide and 20 parts of dicetylperoxodicarbonate. The reactor was sealed, purged with nitrogen, evacuated, the agitator adjusted to a speed of 280 rpm, and the reactor then charged with a mixture of 150 parts of methallyl chloride and 10,000 parts of vinyl chloride. The reactor was heated at a rate of 0.8° C./min to 43° C. and, after 7 hours of polymerizing, heated at 0.8° C./min to 65° C. The product was degasified at a final pressure of 5 bar, separated from the major portion of the water, and dried at 50° C. in a fluidized-bed dryer. The K value of the product is 55.5. As can be seen from Table 1, the improvement in flowability of this product is small.

COMPARATIVE EXAMPLE D (According to DOS No. 2,606,934)

A 40-liter polymerization reactor of stainless steel, equipped with impeller agitator and Pfaudler baffle, was charged with the following components: 20,000 parts of water containing dissolved therein 20 parts of a partially saponified polyvinyl acetate according to Example 1 and wherein there are dispersed 40 parts of dilauryl peroxide and 40 parts of dicetylperoxodicarbonate. The reactor was sealed, purged with nitrogen, evacuated, the agitator was set at a speed of 280 rpm, and then a mixture of 400 parts of methallyl chloride, 50 parts of diallyl phthalate, and 10,000 parts of vinyl chloride was introduced. The reactor was heated at 0.8° C./min to 54° C. and polymerization was carried out to a final pressure of 5 bar. The product, after degasifying, was separated from the largest portion of the water and dried at 50° C. in a fluidized-bed dryer. The K value of the product is 56. As can be seen from Table 2, the product shows good flowability but the molded articles prepared therefrom have a rough surface with clearly noticeable flow line structure.

TABLE 1

| | First Polymerization Temp. (°C.) | VC Conversion. with Regulator Addition (% by Wt.) | Second Polymerization Temp. (°C.) | Type of Regulator[1] | Amount of Regulator (% by Wt. Based on VC) | K Value[2] | Nonuniformity[3] | Vicat Softening Temp.[4] (°C.) | Spiral Length[5] (cm) | Surface of Finished Article | Transparency of Finished Article |
|---|---|---|---|---|---|---|---|---|---|---|---|
| Standard Suspension PVC | — | — | — | — | — | 58 | 1.1 | 76 | 28.5 | Smooth | Yes |
| Example 1 | 43 | 38 | 74 | A | 3 | 58.5 | 6.0 | 71 | 54 | Smooth | Yes |
| Example 2 | 43 | 34 | 74 | B | 4 | 55.5 | 4.0 | 75 | 47 | Smooth | Yes |
| Example 3 | 54 | 60 | 74 | A | 4 | 57.5 | 5.0 | 70 | 44 | Smooth | Yes |
| Comp. Ex. A | 43 | — | 74 | — | — | 57 | 1.5 | 75 | 32 | Smooth | Yes |
| Comp. Ex. B | 54 | 59 | 54 | A | 3 | 58.5 | 4.0 | 71 | 38.5 | Smooth | Yes |
| Comp. Ex. C | 43 | 0 | 65 | A | 1.5 | 55.5 | — | 72 | 38 | Smooth | Yes |

[1] A = Methallyl chloride B = Trichloroethylene
[2] DIN 53 726
[3] Average molecular weights $\overline{M}_w$, $\overline{M}_n$ determined by gel chromatography, converted by means of the equation:

Nonuniformity $= \dfrac{\overline{M}_w}{\overline{M}_n} - 1$ .

[4] DIN 53 460 (VST/B/50)
[5] Flowability test close to practical conditions: 100 parts of PVC is mixed with 2.5 parts of a Ba/Cd stabilizer and optionally a lubricant in amounts usual for the formulation in a high-speed mixer. This mixture is processed in an injection-molding machine into spirals having a rectangular cross section (width 20 mm, height 2 mm). The length (in cm) of the spirals is evaluated as a measure for the flowability of the product.

TABLE 2

| | Initial Temp. (°C.) | Temp. Rate of Change (°C./min) | Final Temp. (°C.) | VC Conversion with Regulator Addition (% by Wt.) | Type and Amount of Regulator (% by Wt. Based on VC)[1] | Type and Amount of Cross linking Agent (% by Wt. Based on VC) | K-Value[2] | Vicat Softening Temp. (°C.) | Spiral Length[4] (cm) | Surface of Finished Article | Transparency of Finished Article |
|---|---|---|---|---|---|---|---|---|---|---|---|
| Example 4 | 35 | 0.0833 | 75 | 30 | 3 B | Without | 58 | 76 | 44 | Smooth | Yes |
| Example 5 | 35 | 0.0833 | 75 | 41 | 4 A | Without | 57.5 | — | 50 | Smooth | Yes |
| Comp. Ex. D | 54 | 0.0 | 54 | 0 | 4 A | 0.5 Diallyl Phthalate | 56[5] | 75 | 48 | Rough-Dull | Opaque zones with flow line structure |

[1] A = Methallyl chloride B = Trichloroethylene
[2] DIN 53 726
[3] DIN 53 460 (VST/B/50)
[4] See
[5] in Table 1
[5] Product contains gel proportions insoluble in cyclohexanone The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of suspension polyvinyl chloride suitable for processing by injection molding, comprising suspension polymerizing vinyl chloride at at least two polymerization temperatures, subsequent temperature being higher than previous ones, in the presence of an oil-soluble catalyst, a suspension stabilizer, and a regulator, the improvement comprising adding 3-5% by weight based on vinyl chloride of the regulator, said regulator being added to the polymerization mixture in a single addition step, at a point in the polymerization reaction wherein the vinyl chloride conversion is ≧20% by weight and ≦70% by weight.

2. A process of claim 1, wherein the regulator is added to the polymerization mixture at a vinyl chloride conversion of ≧25% by weight and ≦50% by weight.

3. A process of claim 1 wherein the polymerization is conducted in two or more temperature stages, and the polymerization temperature rises after termination of the first stage.

4. A process of claim 3 wherein the polymerization temperature rises stepwise between stages.

5. A process of claim 3 wherein the polymerization temperature rises continuously between stages.

6. A process of claim 1 wherein the polymerization is conducted under continuous temperature increase.

7. A process of claim 3 wherein the polymerization is conducted at two temperature stages, that of the first being 25° to 54° C. and that of the second being 55° to 80° C. and the regulator is added in the first stage.

8. A process of claim 7 wherein the first and second temperatures are 35°-50° C. and 65°-75° C., respectively.

9. A process of claim 7 wherein the rate of temperature change between the initial temperature and the final temperature is 0.01°-5° C./minute.

10. A process of claim 1 wherein after the regulator is added, the temperature increase to the final temperature is conducted at a rate of about 0.01° to 5° C./minute and is effected $\geq 5$ minutes, but $\leq 15$ minutes after adding the regulator.

11. A process of claim 1, 2, 4, 5, 6, 7 or 8 wherein after the regulator is added, the temperature increase to the final temperature is conducted at a rate of about 0.01° to 5° C./minute and is effected $\geq 5$ minutes, but $\leq 15$ minutes after adding the regulator.

12. A process of claim 1 wherein the oil-soluble, free radical initiator is a combination of at least two initiators, their half-life periods being adapted to the selected polymerization temperature stages in such a way that their half-life periods are 1 to 10 hours at each polymerization temperature.

13. A process of claim 7 wherein the temperature rises continuously after termination of the first polymerization stage.

* * * * *